United States Patent
Jeong et al.

(10) Patent No.: US 8,833,833 B2
(45) Date of Patent: Sep. 16, 2014

(54) RECLINING APPARATUS FOR A REAR SEAT OF A VEHICLE

(71) Applicants: Hyundai Motor Company, Seoul (KR); Kia Motors Corporation, Seoul (KR); Hyundai Dymos Incorporated, Chungcheongnam-Do (KR); Dae Chang Seat Co., Ltd., Gyeongsangbuk-Do (KR)

(72) Inventors: Chan Ho Jeong, Gyeonggi-do (KR); Jun Yeol Heo, Gyeonggi-do (KR); Gil Ju Kim, Seoul (KR); Chang Ju Gi, Incheon (KR); Seon Chae Na, Gyeonggi-do (KR); Sang Uk Yu, Seoul (KR); Eom Seok Yoo, Gyeonggi-do (KR); Young Sun Lee, Gyeonggi-do (KR); In Chang Hwang, Ulsan (KR); Myung Soo Lee, Ulsan (KR)

(73) Assignees: Hyundai Motor Company, Seoul (KR); Kia Motors Corporation, Seoul (KR); Hyundai Dymos Incorporated, Seosan, Chungcheongnam-Do (KR); Dae Chang Seat Co., Ltd., Gyeongju, Gyeongsangbuk-Do (KR)

( * ) Notice: Subject to any disclaimer, the term of this patent is extended or adjusted under 35 U.S.C. 154(b) by 0 days.

(21) Appl. No.: 13/874,763

(22) Filed: May 1, 2013

(65) Prior Publication Data
US 2014/0167474 A1    Jun. 19, 2014

(30) Foreign Application Priority Data
Dec. 17, 2012    (KR) .......................... 10-2012-0147907

(51) Int. Cl.
    *B60N 2/10*    (2006.01)
    *B60N 2/22*    (2006.01)

(52) U.S. Cl.
    CPC .......................................... *B60N 2/22* (2013.01)
    USPC ..................................... 296/65.16; 297/378.13

(58) Field of Classification Search
    CPC ........ B60N 2/22; B60N 2/01583; B60N 2/68; B60N 2002/0288
    USPC .......... 296/65.16, 65.03, 65.17, 65.09, 37.16; 297/378.14, 378.13, 336
    See application file for complete search history.

(56) References Cited

U.S. PATENT DOCUMENTS

2011/0018326 A1 *    1/2011    Sayama .................... 297/378.14

FOREIGN PATENT DOCUMENTS

| JP | 2007-050121 A | 3/2007 |
| JP | 2009-089871 A | 4/2009 |
| KR | 20-1999-0029166 | 7/1999 |
| KR | 10-2012-0063371 A | 6/2012 |

* cited by examiner

*Primary Examiner* — Joseph Pape
*Assistant Examiner* — Dana Ivey
(74) *Attorney, Agent, or Firm* — Edwards Wildman Palmer LLP; Peter F. Corless (57) ABSTRACT

The present invention relates to a reclining apparatus for a rear seat of a vehicle, having a back frame having a upper end and a lower end; a cushion frame having a front side and a back side, wherein the back side of the cushion frame is pivotally connected to the lower end of the back frame; a back frame locking module disposed on the upper end of the back frame, the back frame locking module removably engageable to a body panel and acting as a pivot center when engaged with the body panel; and a guide module configured to guide the cushion frame pivotally connected to the back frame so that the lower portion of the back frame pivots about the upper portion when the cushion frame slides up forward or down rearward to allow the back frame to move between an upright position and a reclined position.

8 Claims, 13 Drawing Sheets

FIG. 1

Prior Art

RECLINING APPARATUS FOR A REAR SEAT OF A VEHICLE

CROSS-REFERENCE TO RELATED APPLICATION

This application claims under 35 U.S.C. §119(a) the benefit of Korean Patent Application No. 10-2012-0147907, filed on Dec. 17, 2012 in the Korean Intellectual Property Office, the disclosure of which is incorporated herein in its entirety by reference.

BACKGROUND (a) Technical Field

The present invention relates to a reclining apparatus for a rear seat of a vehicle, and more particularly, to a reclining apparatus for a rear seat of a vehicle that allows a reclining movement of the rear seat back.

(b) Background Art

Figure 1:
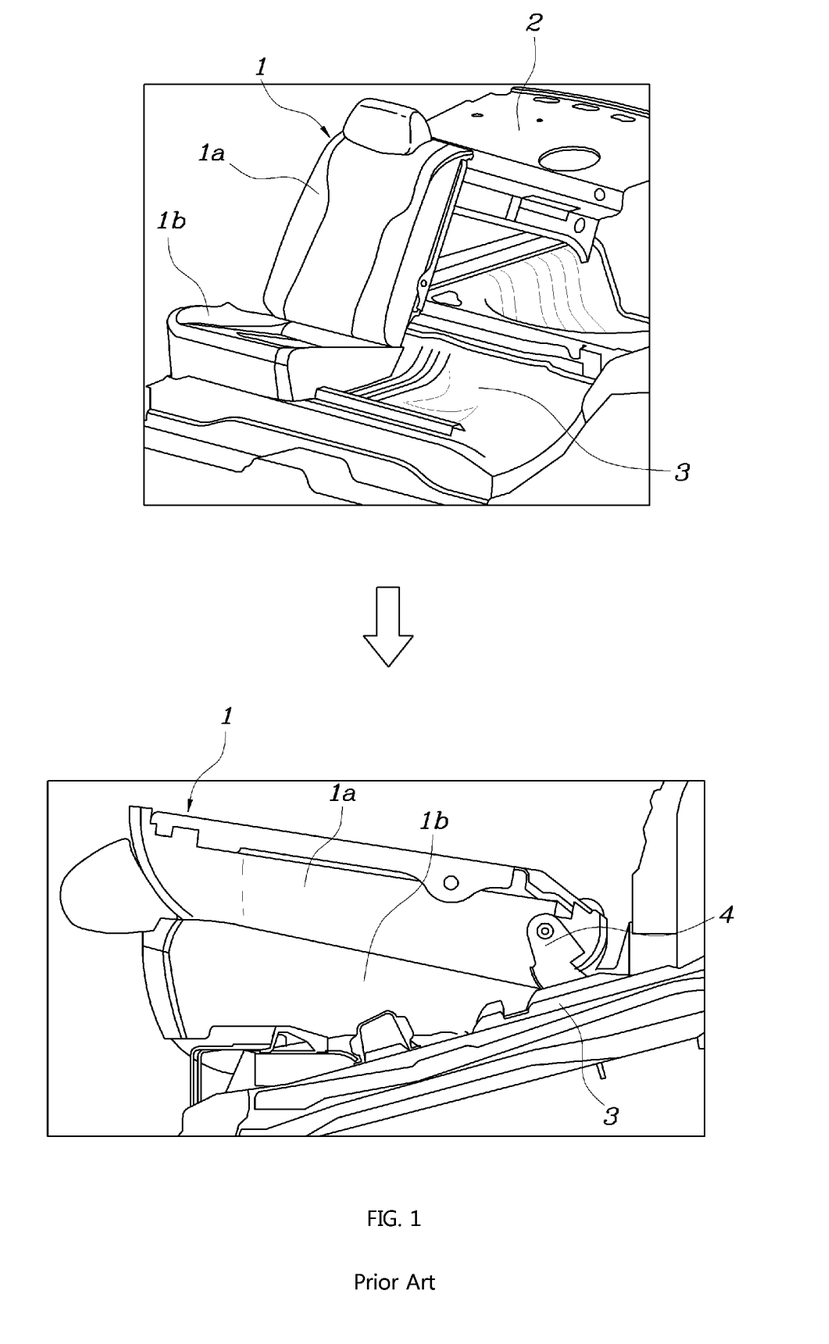
FIG. 1 is a view showing a rear seat of the conventional art, in which the seat back can only be folded down.

FIG. 1 shows a conventional rear seat 1 in an upright (FIG. 1, top) and folded (FIG. 1, bottom) position. Generally, conventional rear seats 1 of common cars may be folded (e.g., seat back 1a may pivot forward so that it contacts seat cushion 1b as shown in FIG. 1, bottom), but do not have the ability to be reclined. For example, the angle of seat back 1a on a conventional seat back 1 may not be adjusted. Unfortunately, this design defect creates significant discomfort for passengers riding in the rear seat for a long time.

On a conventional rear seat 1, a striker (not shown) is disposed at the top of the seat back 1a and a latch (not shown) is disposed on a car body panel 2 (rear package tray panel) behind the seat back 1a, so the seat back 1a has a locking mechanism created by the combination of the striker and the latch. Further, a hinge bracket 4 is fixed to a car body panel 3 of the under floor of a vehicle and the lower portion of the seat back 1a is pivotally coupled to the hinge bracket 4. Therefore, when the striker is unlocked from the latch, the seat back 1a is allowed to pivot about the coupling point with the hinge bracket 4, thus a folding movement is allowed.

Furthermore, it should be noted that the description provided above is merely for aiding in understanding the background of the present invention, and should not be construed as admitted prior art.

SUMMARY OF THE DISCLOSURE

The present invention has been made in an effort to remove the defects described above, and it is an object of the present invention to improve comfort and convenience for a rear seat passenger by providing a reclining apparatus for a rear seat of a vehicle that allows the rear seat back to recline.

In order to achieve the object of the present invention, the present invention provides a reclining apparatus for a rear seat of a vehicle, having a back frame having a upper end and a lower end; a cushion frame having a front side and a back side, wherein the back side of the cushion frame is pivotally connected to the lower end of the back frame; a back frame locking module disposed on the upper end of the back frame, the back frame locking module configured to be removably engageable to a body panel and to act as a pivot center when engaged with the body panel; and a guide module configured to guide the cushion frame pivotally connected to the back frame so that the lower portion of the back frame pivots about the upper portion when the cushion frame slides up forward or down rearward to allow the back frame to move between an upright position and a reclined position.

The apparatus includes: a back frame locking module that is disposed on the upper portion of the back frame and a car body panel disposed behind the back frame, which prevents the back frame from folding when in a locked position and which also functions as a pivot center of the back frame when reclining the rear seat; a base frame fixed in the front-rear direction to an under floor body panel; and a guide module that connects the base frame with the cushion frame and that guides the cushion frame connected with the back frame to be movable up forward or down rearward when the lower end of the back frame pivots about the back frame locking module.

Further, the apparatus includes: a guide locking module disposed on the base frame and the cushion frame to be connected with them and that controls the operation of the guide module; and a cushion frame operating mechanism that connects the base frame with the cushion frame and provides a force to allow the cushion frame to move up forward, when the guide locking module is unlocked.

The back frame locking module includes: a striker disposed on the upper end of the back frame by a striker fixing bracket to protrude rearward; a frame fixing bracket pivotally coupled to the striker fixing bracket by a hinge shaft and that is fixed to the back frame; and a latch disposed on the car body panel positioned behind the back frame, the latch configured to engage the locked state of the rear seat back when coupled to the striker, in which the hinge shaft is the pivot center of the back frame in reclining.

A base pipe is fixed through both rear sides of the cushion bracket, a support frame is disposed to connect the rear ends of the base frame with the base pipe, rear guide holes cut in the front-rear direction are formed at the rear ends of the base frame, and the support frame can be coupled to the rear ends of the base frame by a rear shaft that is movable through and along the rear guide holes.

The guide module includes: a front guide hole cut in the front-rear direction and configured to be inclined upward to the front at the front portion of the base frame; a front shaft movable through and along the front guide hole; and a guide bracket that is integrally formed on the cushion frame and to which the front shaft is coupled.

The guide locking module includes: a locking bracket disposed to be pivotally connected to a pivot shaft at a front side of the base frame with a locking groove where the front shaft is inserted; a locking spring wound on the pivot shaft with one end supported by the base frame and the other end supported by the locking bracket and configured to provide an elastic force for the locking bracket so that the locking groove is oriented in the direction of the front guide hole; and a locking lever fixed to the cushion frame and connected with the locking bracket by a wire.

When the front shaft is positioned at the front end of the front guide hole, the front shaft is supported by the locking bracket, so the movement is restricted until the locking lever is operated.

The cushion frame operating mechanism includes: a damper bracket that is coupled to the base frame; and a gas damper equipped with a cylinder filled with a gas, a first end of which is connected to the cushion frame and a second end is connected to the damper bracket and a piston rod moving through the cylinder.

The cushion frame operating mechanism includes: a tension spring having a first end fixed to the rear portion of the base frame and a second end fixed to the rear shaft, the tension spring configured to provide an elastic force to the rear shaft so that the rear shaft is allowed to move forward along the rear guide hole; and a torsion bar that has one end supported by the rear portion of the cushion frame, through the base pipe, and that moves up forward the cushion frame, using a return force due to torsion when the guide locking module is unlocked.

BRIEF DESCRIPTION OF THE DRAWINGS

The above and other features of the present invention will now be described in detail with reference to certain exemplary embodiments thereof illustrated by the accompanying drawings which are given hereinbelow by way of illustration only, and thus are not limitative of the present invention, and wherein.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Ranges provided herein are understood to be shorthand for all of the values within the range. For example, a range of 1 to 50 is understood to include any number, combination of numbers, or sub-range from the group consisting of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50, as well as all intervening decimal values between the aforementioned integers such as, for example, 1.1, 1.2, 1.3, 1.4, 1.5, 1.6, 1.7, 1.8, and 1.9. With respect to sub-ranges, "nested sub-ranges" that extend from either end point of the range are specifically contemplated. For example, a nested sub-range of an exemplary range of 1 to 50 may comprise 1 to 10, 1 to 20, 1 to 30, and 1 to 40 in one direction, or 50 to 40, 50 to 30, 50 to 20, and 50 to 10 in the other direction.

A reclining apparatus of a rear seat for a vehicle according to exemplary embodiments of the present invention is described hereafter in detail with reference to the accompanying drawings.

A reclining apparatus for a rear seat according to an exemplary embodiment of the present invention, as shown in FIGS. 2 to 13, includes a back frame locking module 20 that is a pivot center of a back frame 11 when the seat back reclines and a guide module 40 that guides a cushion frame 14 connected to the back frame 11 when sliding, in which as the cushion frame 14 slides up forward or down rearward, the lower portion of the back frame 11 pivots about the upper portion, thereby allowing reclining.

Figure 2:
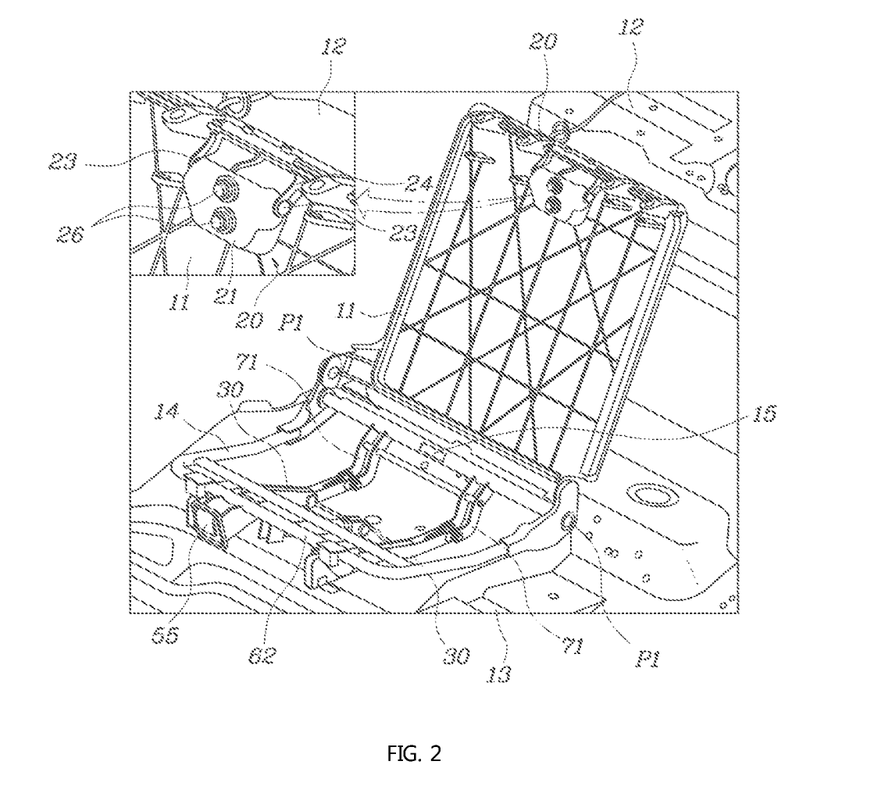
FIG. 2 is a view showing a rear seat equipped with a reclining apparatus according to an exemplary embodiment of the present invention.
Figure 3:
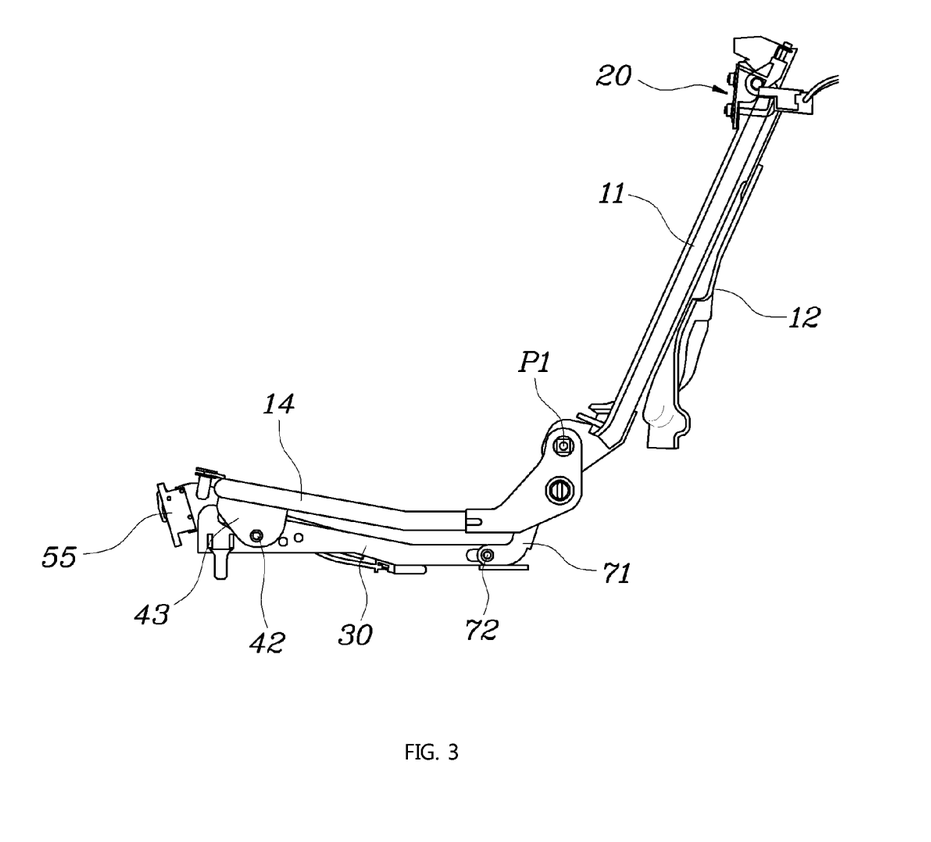
FIG. 3 is a side view of FIG. 2, showing the status of the rear seat before a reclining operation.

As shown in FIG. 2, the reclining apparatus may include: a back frame locking module 20 disposed on the upper portion of the back frame 11 and a car body panel 12 disposed behind the back frame 11, which prevents the back frame 11 from folding in the locked position, and also functions as a pivot center for the back frame 11 when reclining; a base frame 30 fixed in the front-rear direction to a car body panel 13 of an under floor; a guide module 40 (see, e.g., FIG. 6) that connects the base frame 30 with the cushion frame 14 and that guides the cushion frame 14 connected with the back frame 11 so as to be movable up forward or down rearward, when the lower end of the back frame 11 is pivoting about the back frame locking module 20; a guide locking module 50 (see e.g., FIG. 7) that is disposed on the base frame 30 and the cushion frame 14 to be connected with them and that controls the operation of the guide module 40; and a cushion frame operating mechanism 60 (see e.g., FIG. 4) disposed to connect the base frame 30 with the cushion frame 14, and thus provides a force to allow the cushion frame 14 to move up forward, when the guide locking module 50 is unlocked.

Throughout the drawings, the left side is the front of the rear seat and the right is the rear of the rear seat.

Both lower sides of the back frame 11 and both rear sides of the cushion frame 14 are hinged to pivotally overlap each other, and reference numeral P1 indicates the hinged portion of the back frame 11 and the cushion frame 14.

The back frame locking module 20 includes a striker 22 (see e.g., FIG. 5) disposed on, and protruding rearward from, a striker fixing bracket 21 located on the upper portion of the back frame 11; a frame fixing bracket 24 that is pivotally coupled to the striker fixing bracket 21 by a hinge shaft 23 that is fixed to the back frame 11; and a latch 25 (see e.g., FIG. 5) that is equipped on the car body panel 12 disposed behind the back frame 11 that locks the striker 22 to implement locking locked status, in which the hinge shaft 23 is the pivot center of the back frame 11 when reclining That is, the striker fixing bracket 21 is attached to the front surface that faces the front at the upper middle portion of the back frame 11, both ends of the striker 22 protrude forward integrally through the back frame 11 and the striker fixing bracket 21 from behind, and nuts 26 are fastened to both ends of the striker 22 protruding forward, respectively, thereby installing the striker 22. Therefore, when the striker 22 and the latch 25 are locked, the striker fixing bracket 21, the striker 22, and the latch 25 are integrally combined into one structure, so that the back frame 11 can pivot about the hinge shaft 23 connecting the striker fixing bracket 21 with the frame fixing bracket 24.

Furthermore, a base pipe 15 is fixed through both rear sides of the cushion bracket 14 and a support frame 71 is disposed to connect the rear ends of the base frame 30 with the base pipe 15, then rear guide holes 31 (see e.g., FIG. 4), which are cut in the front-rear direction at the rear ends of the base frame 30, are formed and the support frame 71 can be coupled to the rear ends of the base frame 30 by a rear shaft 72 (see e.g., FIG. 3) that can move along and through the rear guide holes 31. That is, as the cushion bracket 14 moves with respect to the base frame 30, the support frame 71 moves along the rear guide hole 31.

Figure 6:
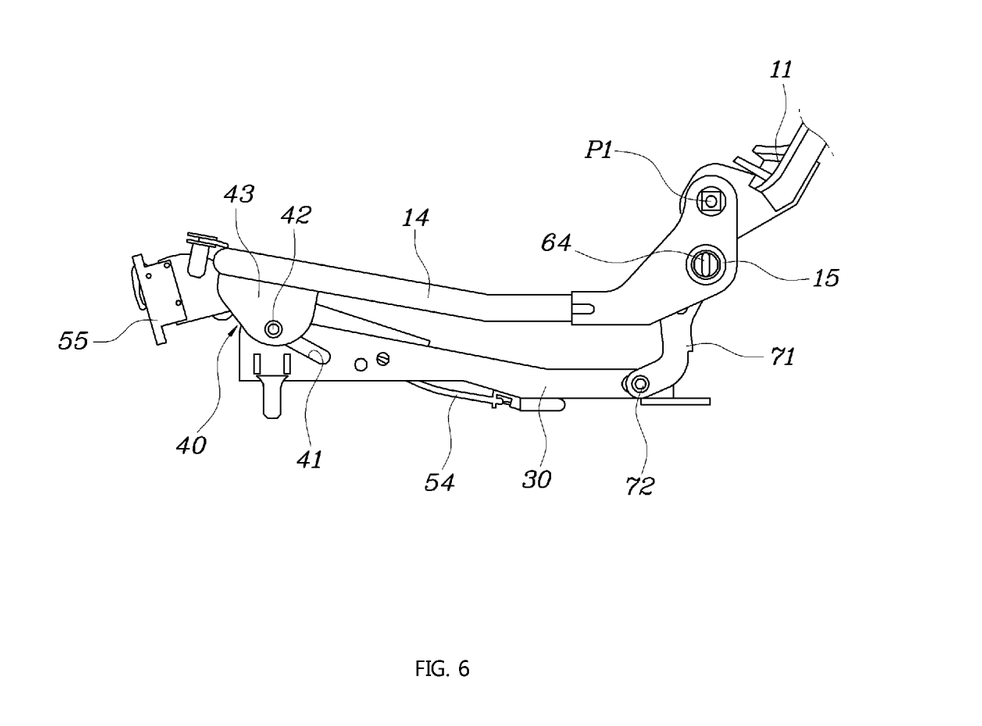
FIG. 6 is a cross-sectional view illustrating a guide module according to an exemplary embodiment of the present invention.
Figure 7:
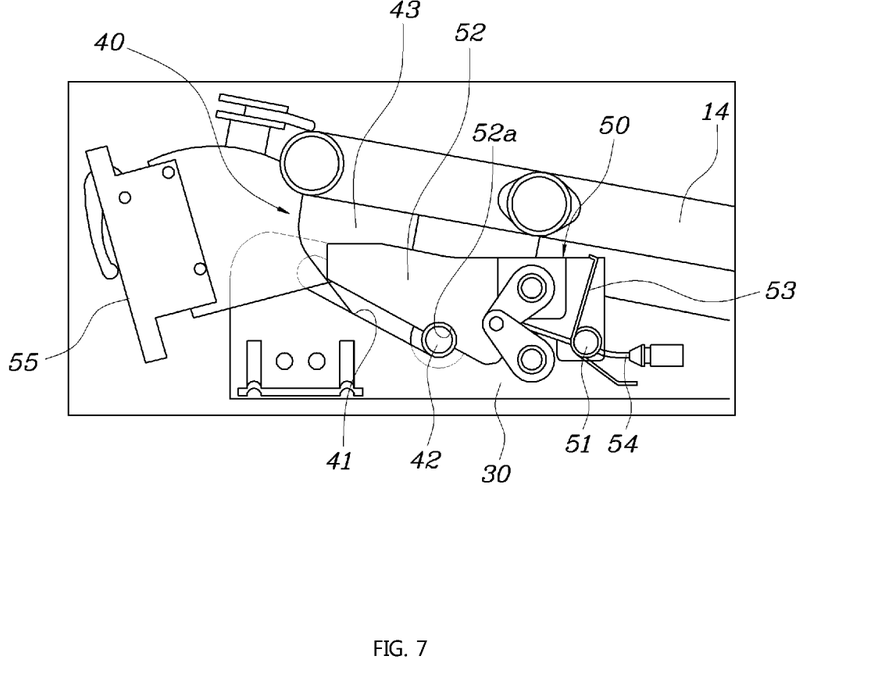
FIGS. 7 to 9 are views illustrating a guide locking module according to an exemplary embodiment of the present invention.

As shown in FIGS. 6 and 7, a guide module 40 includes a front guide hole 41 cut in the front-rear direction to be inclined upward to the front at the front portion of the base frame 30, a front shaft 42 movable through and along the front guide hole 41, and a guide bracket 43 that is integrally formed with the cushion bracket 14 and to which the front shaft 42 is coupled.

Furthermore, the guide locking module 50 includes: a locking bracket 52 pivotal by a pivot shaft 51 at a front side of the base frame 30 with a locking groove 52a proximate to where the front shaft 42 is inserted; a locking spring 53 wound on the pivot shaft 51, one end of which is disposed to be supported by the base frame 30 and the other end is disposed to be supported by the locking bracket 52, which provides an elastic force to the locking bracket 52 such that the locking groove 52a faces the front guide hole 41; and a locking lever 55 that is fixed to the cushion frame 14 and connected with the locking bracket 52 by a wire 54.

FIG. 7 shows the status when the front shaft 42 is inserted in the locking groove 52a of the locking bracket 52, at the rear end of the front guide hole 41, in which the cushion frame 14 is in a locked state in which it is unmovable due to a locking force of the guide locking module 50. As the locking bracket 52 pivots clockwise about the pivot shaft 51 by operating the locking lever 55 from the status of FIG. 7, the front shaft 42 comes out of the locking groove 52a, the front shaft 42 is correspondingly moved to the front end along the front guide groove 41 by the force from the cushion frame operating mechanism 60, as shown in FIG. 8, and the cushion frame 14 is moved up forward by the movement of the front shaft 42.

Figure 8:
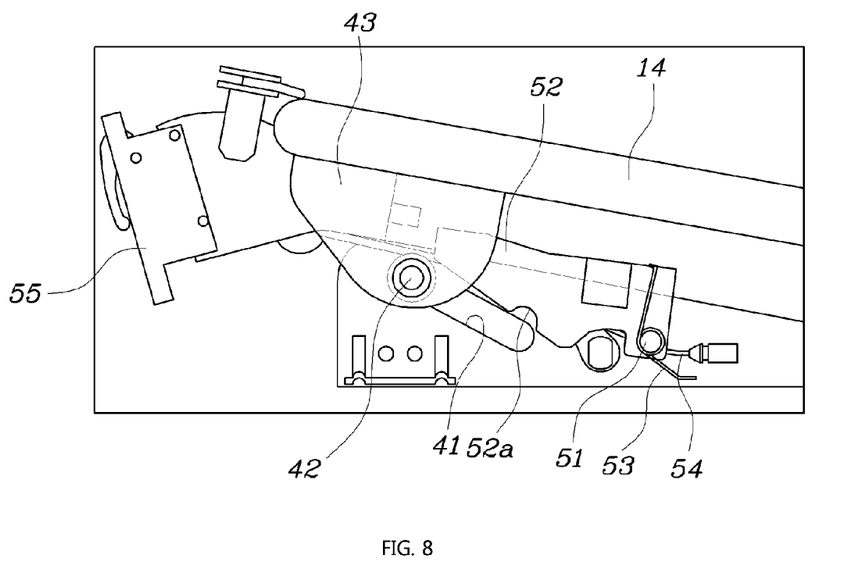
Figure 9:
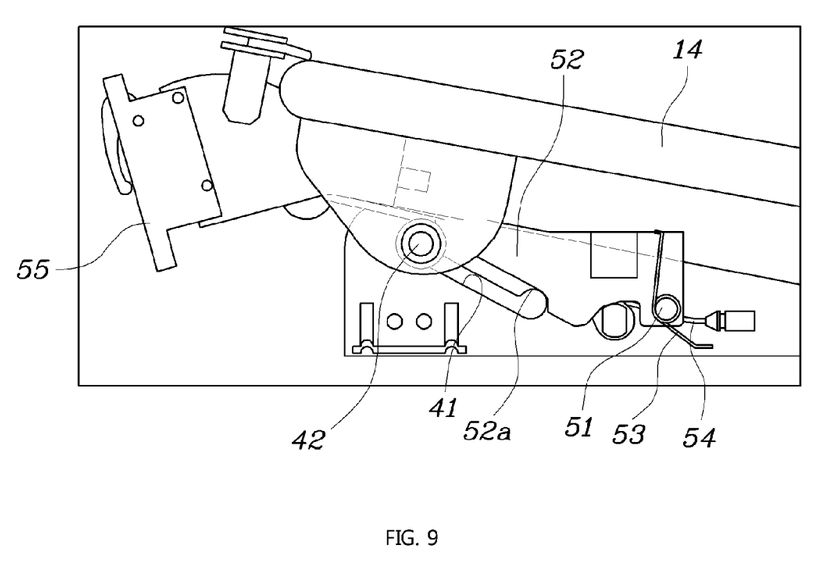

Furthermore, as the operation of the locking lever 55 is stopped in the status of FIG. 8, the locking bracket 52 pivots counterclockwise about the pivot shaft 51 by a return force of the locking spring 53, as in FIG. 9, and the front shaft 42 at the front end of the front guide hole 41 is supported and cannot moved rearward by being supported on the front of the locking bracket 52, so that the cushion frame 14 that has moved up forward can maintain the position.

Figure 4:
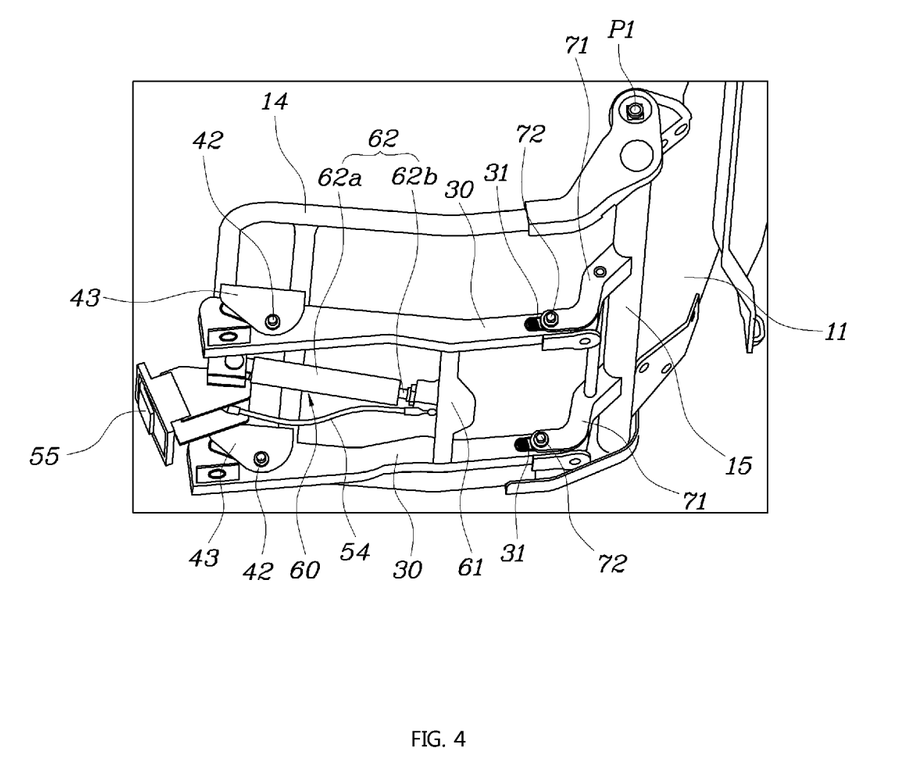
FIG. 4 is a perspective view showing the bottom of a cushion frame in FIG. 2.
Figure 5:
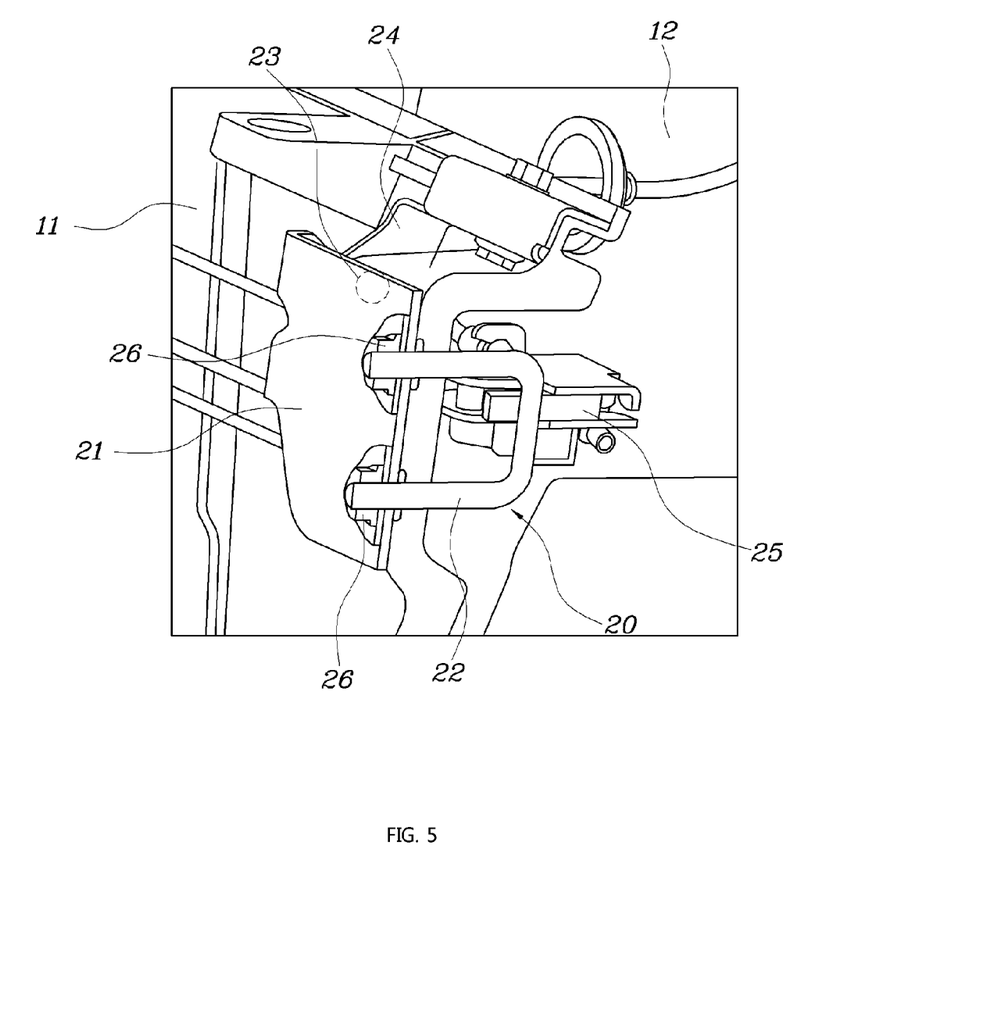
FIG. 5 is a cross-sectional view illustrating a back frame locking module according to an exemplary embodiment of the present invention.

On the other hand, the cushion frame operating mechanism 60 according to an exemplary embodiment of the present invention, as shown in FIG. 4, includes: a damper bracket 61 that is coupled to the base frame 30; and a gas damper 62 equipped with a cylinder 62a filled with a gas, one end of which is connected to the cushion frame 14 and the other end is connected to the damper bracket 61, and a piston rod 62b moving along the cylinder 62a.

Figure 10:
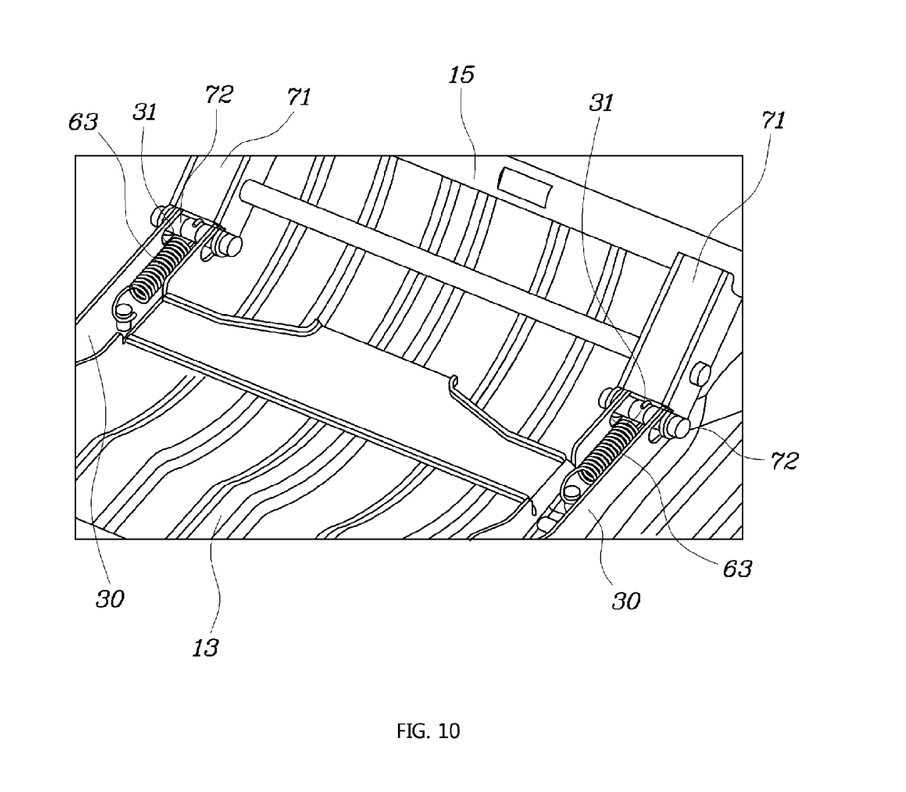
FIGS. 10 and 11 are views illustrating another exemplary embodiment of a cushion frame operating mechanism according to the present invention.
Figure 11:
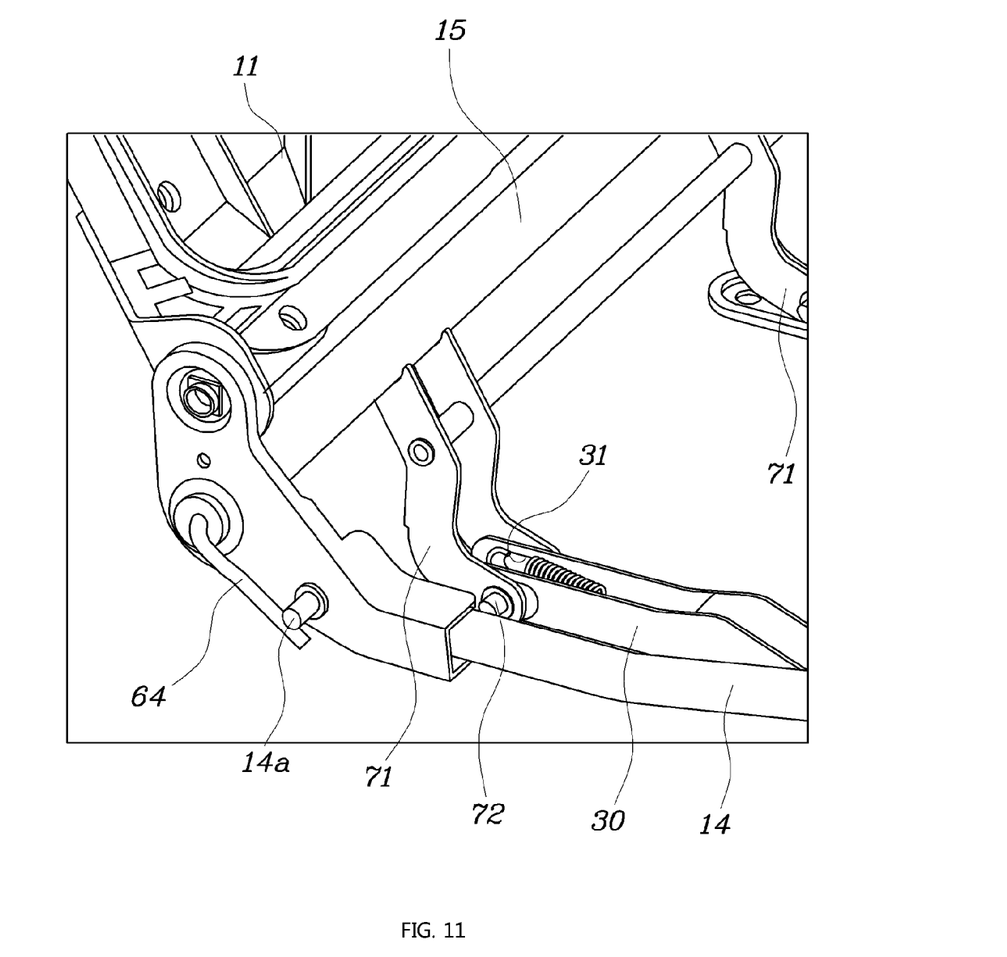
Figure 12:
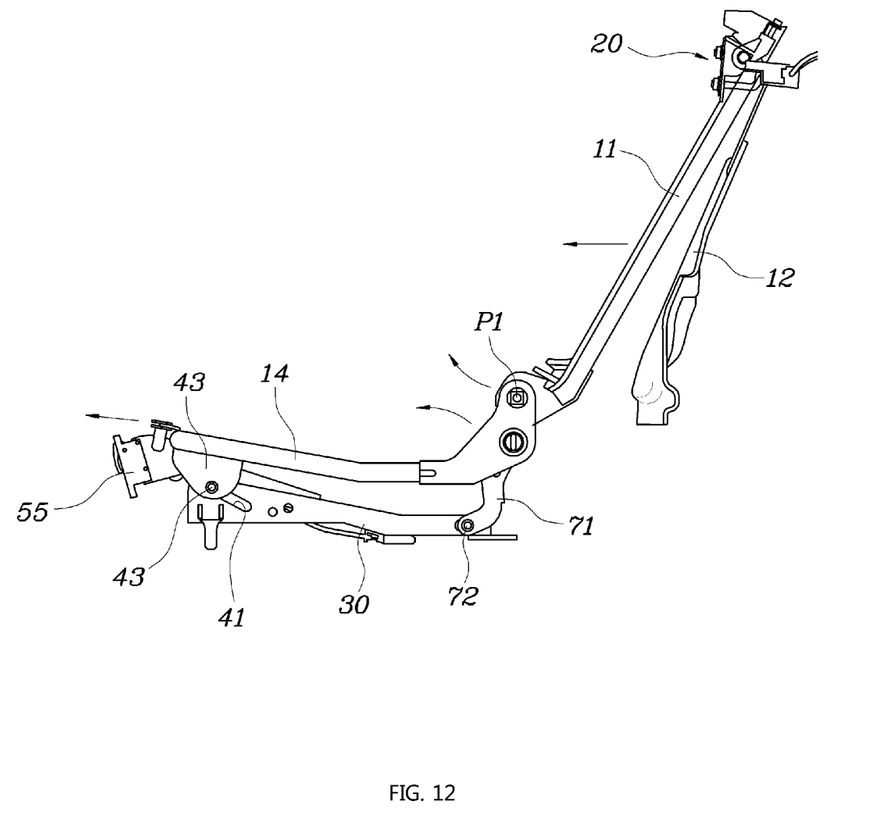
FIG. 12 is a view showing the status after a reclining apparatus according to an exemplary embodiment of the present invention is operated.
Figure 13:
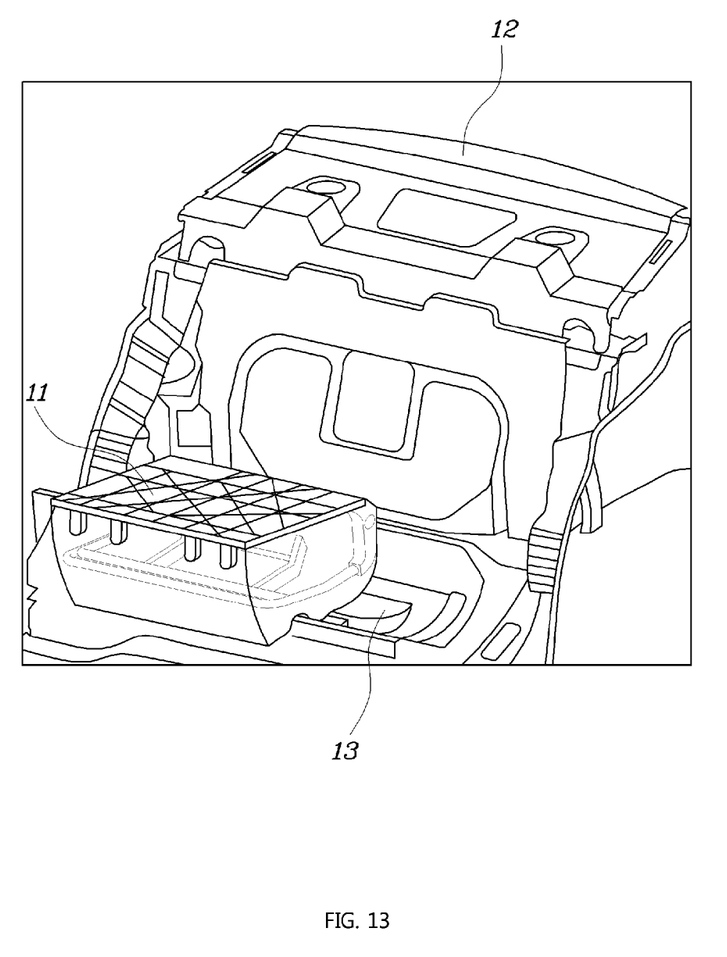
FIG. 13 is a view when a seat back frame has been folded.

Further, a cushion frame operating mechanism 60 according to another exemplary embodiment of the present invention, as shown in FIGS. 10 and 11, includes: a tension spring 63, one end of which is fixed to the rear portion of the base frame 30 and the other end is fixed to the rear shaft 72, provides an elastic force to the rear shaft 72 so that the rear shaft 72 can move forward along the rear guide hole 31; and a torsion bar 64 that has one end supported by the rear portion of the cushion frame, through the base pipe 15, and moves up forward the cushion frame 14, using a return force due to torsion when the guide locking module 50 is unlocked.

The operation of an exemplary embodiment of the present invention is described hereafter.

As a user operates the locking lever 55 to recline the seat back of the rear seat, the locking bracket 52 pivots clockwise about the pivot shaft 51 from the locking state shown in FIG. 7, into the unlocking state shown in FIG. 8 by a pulling force generated by the wire 54. Accordingly, the cushion frame 14 receives a force to move forward by the operation of the cushion frame operating mechanism 60, so that the cushion frame operating mechanism 60 may be, for example, the gas damper 62 or a pneumatic damper, or may be composed of the tension spring 63 and the torsion bar 64.

The gas damper 62 may receive a force directly from the cushion frame 14, while the tension spring 63 and the torsion bar 64 apply a force to the cushion frame 14 through the support frame 71 and the base pipe 15. That is, when the guide locking module 50 is unlocked, the support frame 71 is moved forward along the rear guide hole 31 together with the rear shaft 72 by the return force of the tension spring 63, and the movement force of the support frame 71 is transmitted to the base pipe 15 and the base pipe 15 pushes forward the rear portion of the cushion frame 14. Further, as the torsional return force of the torsion bar 64 is also transmitted to the cushion frame 14, the cushion frame 14 is moved forward by the return force of the tension spring 63 and the torsional return spring of the torsion bar 64.

As described above, as the guide locking module 50 is unlocked and the cushion frame operating mechanism 60 is operated, the cushion frame 14 is moved forward, in which the forward shaft 42 moves up forward along the front guide hole 41 and the cushion frame 14 also moves up forward.

Further, as the cushion frame 14 moves up forward, the lower end with the hinge joint P1 of the back frame 11 hinged to the cushion frame 14 moves up forward together with the cushion frame 14, so that the back frame 11 reclines such that the angle of the seat back can be adjusted while pivoting about the hinge shaft 23 of the back frame locking module 20.

Further, when the locking lever 55 is released after the seat back finished reclining, the front shaft 42 at the front end of the front guide hole 41 is supported by the front of the locking bracket 52 and that is bound to be unmovable rearward, as in FIG. 9, so that the cushion frame 14 that has moved up forward and the back frame 11 that has reclined can maintain the position. Further, since the back frame 11 can smoothly pivot with respect to the cushion frame 14 by the hinge joint P1, it is possible to pivot and fold the back frame forward, as in FIG. 13, when the user unlocks the back frame locking module 20.

As described above, according to an exemplary embodiment of the present invention, the seat back of a rear seat can fold and recline, so it is possible to considerably improve comfort and convenience for a rear seat passenger, and thereby can also improve a commercial value.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A reclining apparatus for a rear seat of a vehicle, comprising:
    a back frame having an upper end and a lower end;
    a cushion frame having a front side and a back side, wherein the back side of the cushion frame is pivotally connected to the lower end of the back frame;
    a back frame locking module disposed on the upper end of the back frame, the back frame locking module configured to be engageable to a vehicle body panel and to act as a pivot center when engaged with the vehicle body panel; and
    a guide module configured to guide the cushion frame pivotally connected to the back frame so that the lower portion of the back frame pivots about the upper end when the cushion frame slides up forward or down rearward, to allow the back frame to move between an upright position and a reclined position,
    wherein the back frame locking module prevents the back frame from folding when engaged with the vehicle body panel, and
    wherein the back frame locking module further includes:
        a striker disposed on the upper end of the back frame by a striker fixing bracket and protrudes rearward;
        a frame fixing bracket pivotally coupled to the striker fixing bracket by a hinge shaft and fixed to the back frame; and
        a latch disposed on the vehicle body panel behind the back frame configured to allow engagement with the back frame locking module.

2. The apparatus of claim 1, further comprising a base frame fixed in the front-rear direction to a floor body panel, wherein the base frame is connected to the cushion frame by the guide module, and the guide module further includes a guide locking module.

3. The apparatus of claim 2, further comprising a cushion frame operating mechanism configured to provide a force to allow the cushion frame to move up and forward when the guide locking module is unlocked.

4. The apparatus of claim 3, wherein the cushion frame operating mechanism further comprises:
    a damper bracket operably coupled to the base frame; and
    a gas damper equipped with a cylinder filled with a gas having a first end connected to the cushion frame and a second end connected to the damper bracket and a piston rod moving through the cylinder.

5. The apparatus of claim 4, wherein the cushion frame operating mechanism further comprises:
    a tension spring having a first end fixed to the rear portion of the base frame and a second end fixed to the rear shaft, the tension spring configured to provide an elastic force to the rear shaft so that the rear shaft is allowed to move forward along the rear guide hole; and
    a torsion bar having a first end supported by the rear portion of the cushion frame, through the base pipe, the torsion bar configured to moves the cushion frame up forward using a return force due to torsion generated when the guide locking module is unlocked.

6. The apparatus of claim 2, wherein the guide module further comprises:
    a front guide hole cut in the front-rear direction at the front portion of the base frame and, the front guide hole configured to be inclined upward to the front;
    a front shaft configured to be movable along and through the front guide hole; and
    a guide bracket integrally formed with the cushion bracket, wherein the guide bracket is operably coupled to the front shaft.

7. The apparatus of claim 2, wherein the guide locking module further comprises:
    a locking bracket pivotally connected to a pivot shaft disposed at a front side of the base frame and having a locking groove where the front shaft is inserted;
    a locking spring wound on the pivot shaft with one end supported by the base frame and the other end supported by the locking bracket to provide an elastic force to the locking bracket so that the locking groove is oriented to the front guide hole; and
    a locking lever fixed to the cushion frame and connected with the locking bracket by a wire.

8. The apparatus of claim 7, wherein when the front shaft is positioned at the front end of the front guide hole, the front shaft is supported by the locking bracket until the locking lever is operated.

* * * * *